Patented Oct. 27, 1931

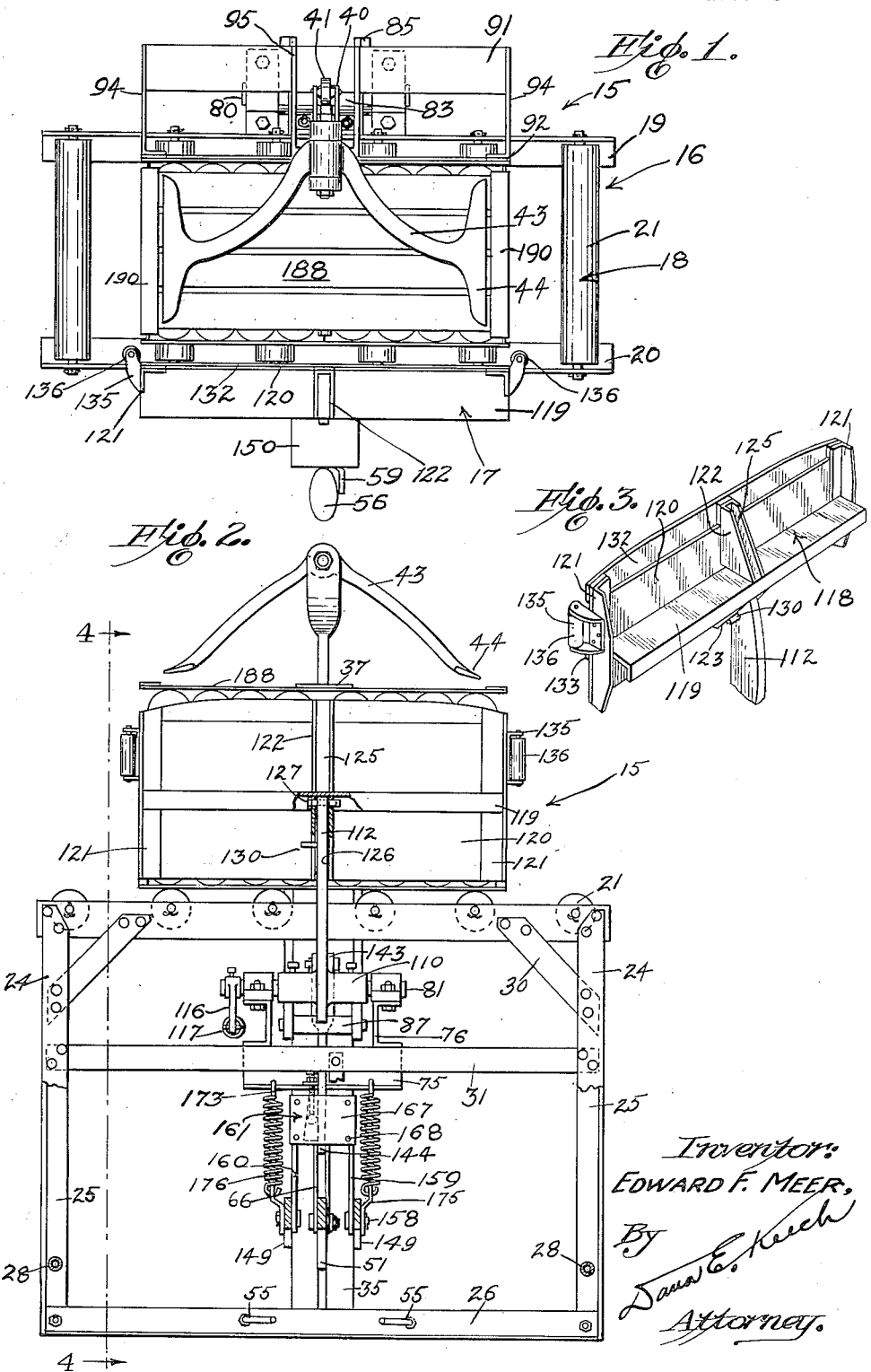

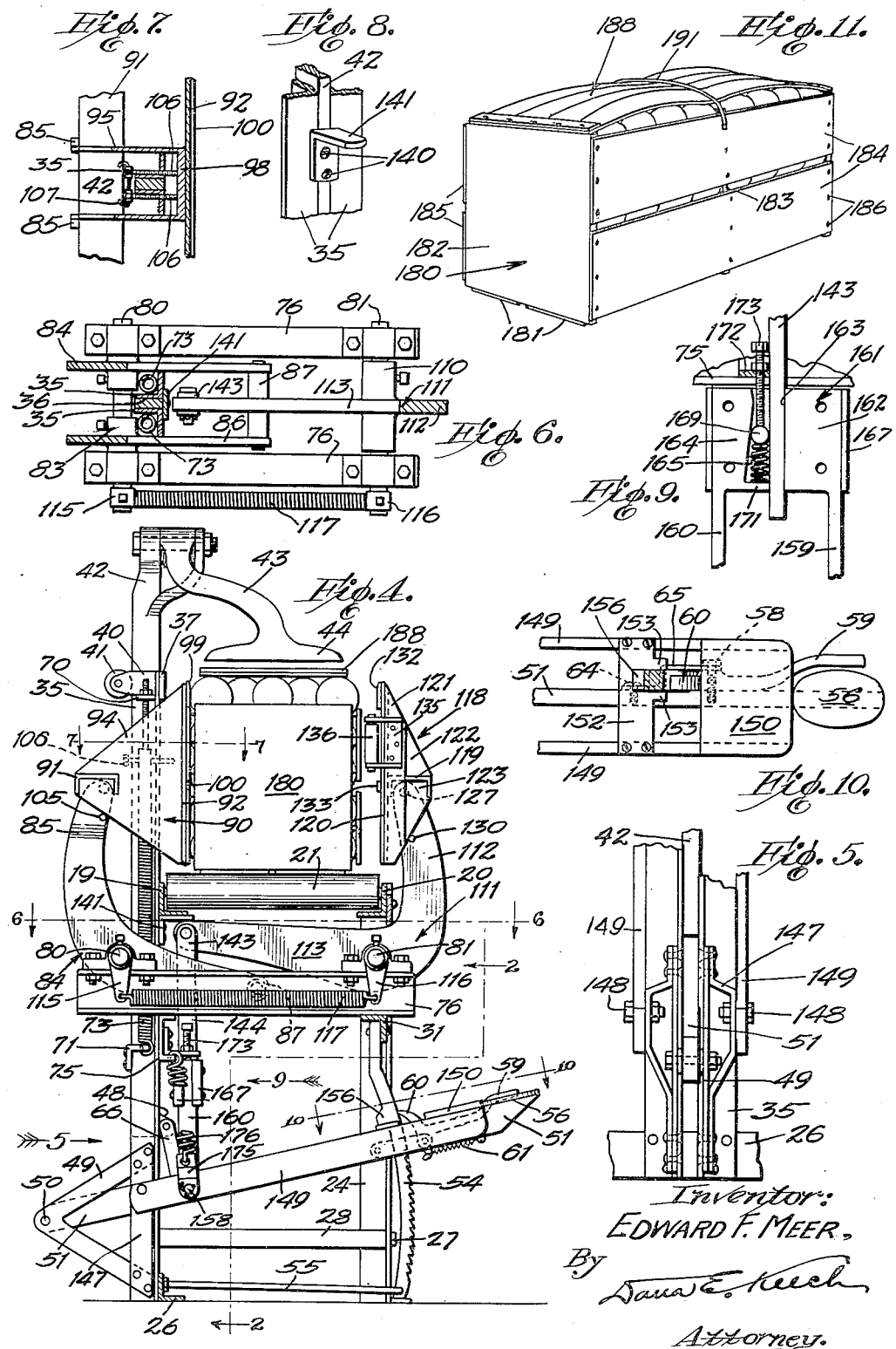

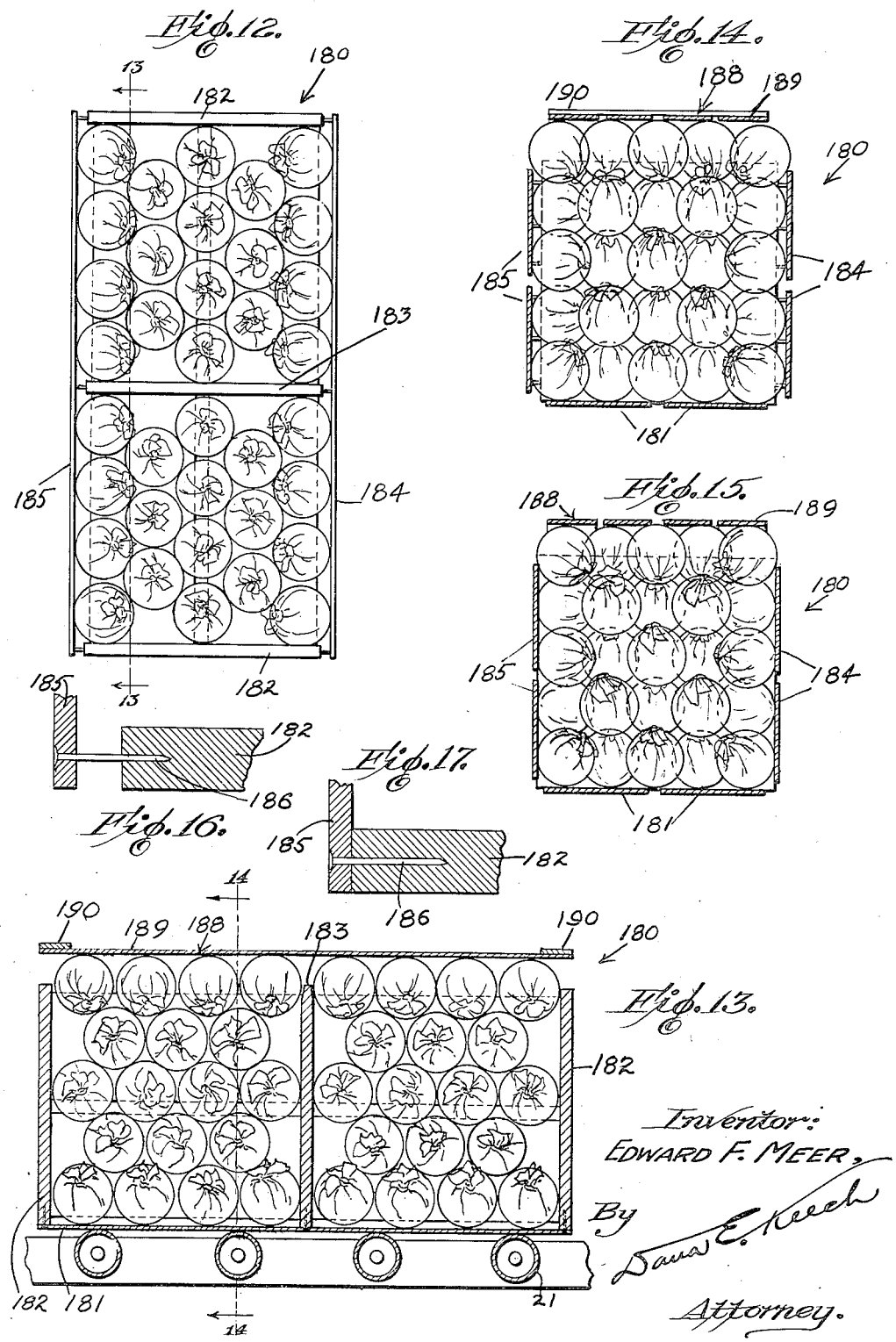

1,829,230

UNITED STATES PATENT OFFICE

EDWARD F. MEER, OF MONROVIA, CALIFORNIA

METHOD OF PACKING FRUIT

Application filed June 24, 1929. Serial No. 373,098.

My invention relates to the marketing of fresh fruit and particularly to the art of packing fresh fruit for shipment.

The common practice in packing many kinds of fruit is to hire laborers to wrap and place the fruit in containers by hand. In order for the fruit to fill the container after two weeks of shrinkage while en route to market, it is found necessary to pack it into the container fairly snugly in the first place. Expert packers are able to do this rapidly and without injuring the fruit, but on account of the irregularity of employment in the fruit industries and the consequent large labor turnover, relatively inexperienced packers must be depended upon to pack a large portion of every crop. These inexperienced packers bruise a number of pieces of fruit in practically each container they pack, the tendency being for them to press their fingers or knuckles or thumb into the fruit in the effort to wedge it in between the other fruit and a side of the container.

It is correspondingly an object of my invention to provide a method of packing fresh fruit in which relatively inexperienced packers may be used and a tight pack put up without the necessity for handling the fruit in a manner capable of damaging it.

Another object of my invention is to provide a method of packing fresh fruit in which packers generally may pack fruit easier and faster, thereby decreasing the labor cost of packing.

The difficulty of securing the right kind of labor to pack fruit when it is needed, has stimulated considerable effort toward producing a machine which will pack fruit into shipping containers. These efforts have apparently fallen short of success because no machine built could produce a tight pack without injuring the fruit getting it into the container.

It is a further object of my invention to provide a method of packing fresh fruit which will facilitate the development of a machine packer by eliminating the necessity for the machine's packing the fruit tightly in the container.

While the method and apparatus of my invention are applicable to many different varieties of fruit and vegetables, an embodiment of the invention as applied to packing oranges has been chosen as a convenient example for the purposes of disclosure.

Further objects and advantages will be made apparent in the following description and in the accompanying drawings, in which:

Fig. 1 is a plan view of a preferred embodiment of a press included in the apparatus of my invention.

Fig. 2 is a front elevational view of the press shown in Fig. 1, parts thereof shown in section as indicated by the line 2—2 of Fig. 4.

Fig. 3 is a perspective view of one of the pressure members of the aforementioned press.

Fig. 4 is an end elevational view of aforesaid press.

Fig. 5 is a fragmentary rear elevational view of Fig. 4 taken in the direction of arrow 5.

Fig. 6 is a horizontal sectional view taken on the line 6—6 of Fig. 4.

Fig. 7 is a fragmentary horizontal sectional view taken on the line 7—7 of Fig. 4.

Fig. 8 is a fragmentary perspective view of a depressing finger embodied in said press.

Fig. 9 is a fragmentary view of a roller grab box embodied in aforesaid press and taken in the direction of the arrow 9 in Fig. 4.

Fig. 10 is a fragmentary sectional view taken on the line 10—10 of Fig. 4.

Fig. 11 is a perspective view of a packed box of oranges.

Fig. 12 is a plan view of an orange box with the sides thereof in expanded position and with a lower layer of oranges of 176 size packed therein.

Fig. 13 is a longitudinal sectional view taken on the line 13—13 of Fig. 12 and showing the left hand edge tier of fruit disposed in said box with the lid disposed thereover.

Fig. 14 is a cross sectional view taken on the line 14—14 in Fig. 13, showing said box completely filled with fruit with the sides thereof still in an extended position.

Fig. 15 is a view similar to Fig. 14 showing the sides of the box compressed to normal position.

Fig. 16 is a diagrammatic fragmentary view illustrating the extent to which a nail is driven into a box end or middle partition when a packing box for carrying out my invention is first assembled.

Fig. 17 is a view similar to Fig. 16 illustrating the position of a side attaching nail when the side has been compressed against the box ends and middle partition.

Referring specifically to the drawings, a combination cover and side press 15 includes a standard cover press 16 and a side press attachment 17.

The cover press 16 includes a short section of roller track 18 having angle iron frame members 19 and 20 upon which are mounted suitable ball bearing rollers 21. The members 19 and 20 are supported by a pair of front legs 24 and a pair of rear legs 25. The legs 25 are connected together by a transverse angle iron member 26 and the legs 25 are individually connected with the legs 24 by bolts 27 passing through compression tubes 28. Rigidly connecting the frame members 19 and 20 with the legs 24 and 25 are short metal braces 30. Connecting upper portions of the legs 24 is a longitudinal angle iron frame member 31.

The cover press 16 also includes a vertical pair of angle iron members 35 between which is provided a cover press slide bar runway 36. The members 35 are connected at their lower ends by the transverse member 26 and at their upper ends by a plate 37 and medially to the longitudinal frame member 19. Provided on the upper ends of the angle iron members 35 are arms 40 rotatably supporting a roller 41 which is disposed tangent to the rear edge of the aforementioned slide bar runway 36. Slidably fitting in said runway is a vertical slide bar 42 having a cover depressing yoke 43. Pivotally mounted on its upper end as shown, this yoke being provided with a pair of cover contact member 44. Extending forwardly from the lower end of the slide bar 42 is a lug 48.

Extending rearwardly from the lower portions of the angle iron members 35 is a pair of V-shaped plates 49 between apexes of which extends a pin 50 upon which is pivotally mounted a cover depressing lever 51. The lever 51 extends forwardly and upwardly between the vertical members 35 and during swinging movement about the pin 50 is guided upon an arcuate ratchet-toothed bar 54 which connects at its upper end to the longitudinal frame member 31 and at its lower end to a pair of rods 55 which rigidly connect to the longitudinal frame member 26.

Provided on the front end of the lever 51 is a foot plate 56. Disposed alongside this plate and pivotally mounted on a cap screw 58 which screws into a suitable opening of the lever 51 is a latch 59 having a pawl 60, the latch 59 being urged by a spring 61 so that when this latch is free the pawl 60 is pressed against the outer face of the ratchet-toothed bar 54. Secured at one end under the head of the cap screw 58 and at the other end by a screw 64 to the lever 51 is a guide bracket 65.

Pivotally connected at its opposite ends to the lever 51 and the lock 48 on the slide bar 42 is a pair of links 66.

Connected at their upper ends to lugs 70 formed at the lower edge of the plates 40, and at their lower ends to inward bent ears formed on a plate 71 attached in any suitable manner to the rear face of the slide bar 42 are long coiled tension springs 73 which yieldably support the slide bar 42, the yoke 43, and the cover depressing lever 51.

The cover press 16 having been described, the side press attachment 17 may now be described as follows:

Secured to forward faces of the vertical frame members 35 is a short horizontal channel iron member 75 and supported on the member 75 and the longitudinal angle iron member 31 are horizontal channel iron frame members 76. Mounted in suitable bearings secured upon upper faces of the members 76 at their opposite ends are shafts 80 and 81. Rigidly secured upon shaft 80 are hubs 83 of a pair of rocker members 84 having arms 85 and 86. Pivotally mounted between extremities of the arms 86 is a heavy roller 87. Pivotally mounted on the upper end of the arms 85 is a box side engaging member 90. The member 90 includes a channel iron member 91, a face plate 92 which is substantially the same size as the complete side of a box which it is desired to press, and triangular outer and inner plates 94 and 95 which are disposed between the member 91 and the plate 92 and are welded to these so as to form a rigid assembly. Disposed between the forward ends of the plates 95 and coextensive vertically therewith is a relatively heavy reinforcing plate of metal 98 which is secured preferably by welding to the plate 92 and the plate 95. The triangular plates 94 and 95 extend slightly above the upper edge of the face plate 92 and support an upper fruit protecting guide 99 in the manner shown so that this plate projects beyond the working face of the face plate 92 a distance equal to the thickness of sides used on a box to be handled in the press 15. A center fruit protecting guide 100 is provided on the working face of the face plate 92 for a purpose to be described later.

The upper ends of the arms 85 are pivotally connected by suitable pins to triangular plates 95 and the box side engaging member 90 is held in the position in which it is shown in Fig. 4 by pins 105 provided on the arms 85 and engaging the plates 95 as shown.

Threaded through suitable openings in the vertical frame members 35 and bearing against the reinforcing plate 98 so as to form rear stops for the side engaging member 90 are bolts 106. These bolts are locked as by a wire 107 threaded through suitable holes in their heads.

The shaft 81 extends through a hub 110 of a rocker 111 having arms 112 and 113. The hub 110 is rigidly secured to the shaft 81.

Provided on corresponding ends of shafts 80 and 81 are a pair of arms 115 and 116, these arms being connected by a spring 117 tending to rotate the shafts 80 and 81 in opposite directions for a purpose to be described later.

Supported on the upper end of the arm 112 is a box side engaging member 118 which includes a channel iron member 119, face plate 120, vertical angle iron members 121, triangular brackets 122 and 123 which are welded to the plate 120 and the member 119 so as to connect these as shown in Fig. 3. The brackets 122 and 123 are similarly formed of sheet metal to provide pockets 125 and 126, the upper end of the arm 112 extending into the pocket 126 and being pivotally connected to the bracket 123 by a pin 127. The side engaging member 118 is maintained in upright position with the rocker 111 in the position shown in Fig. 4 by a pin 130 provided on the arm 112 and engaging the bracket 123.

The angle iron members 121 and bracket 122 extend about the upper edge of the face plate 120 and support an upper fruit guard 132 in a position as shown, this guard being disposed a distance in advance of the face plate 120 equal to the thickness of a side on a box to be handled by the press 15. Provided on the face plate 120 so as to extend inwardly therefrom horizontally along the center line thereof, is a middle fruit guard 133.

Rigidly mounted on outer faces of the vertical angle iron members 121 are roller brackets 135 carrying rollers 136 in the manner shown. Secured to the forward face of the vertical slide bar 42 just beneath the longitudinal press frame member 19 as by screws 140 is an arm depressing finger 141. The finger 141 projects over the rear end of the arm 113 which is pivotally connected to a yoke 143 provided on a pull bar 144 which extends downwardly.

Disposed against the upper and lower ends of the V-shaped plates 49 and secured thereto by the same rivets which secure these plates to the vertical members 35 is a pair of brackets 147 upon which is pivotally mounted by bolts 148 a pair of lever arms 149 which extend forward and upwardly at substantially the same angle as the lever 51 and are connected at the forward end by a pedal plate 150. The foot plate 150 is disposed just inside of and on substantially the same level as the foot plate 56. Secured to upper faces of the bars 149 is a guide plate 152 having fingers 153 which extend on opposite sides of the ratchet-toothed bar 54 so as to guide the lever arms 149 in their pivotal movement about the bolts 148. Engaging the guide plate 152 so as to limit the upward movement of the lever arms 149 is a stop 156 provided on the ratchet bar 54 as shown in Fig. 4. Pivotally connected at their lower ends by pins 158 to the pair of levers 149 is a pair of links 159 and 160. Carried by the links 159 and 160 is a grab clutch 161. This includes a metal head 162 formed on the upper end of the link 159 and having an inner face 163 which bears against one side of the pull bar 143. The upper end of the link 160 has a head 164 having inner face 165 which is spaced from and disposed at an angle to the opposite face of the pull bar 143.

Connecting the link heads 162 and 164 are front and rear plates 167 which are attached thereto as by suitable screws 168. Disposed between the pull bar 143 and the inclined surface 165 is a pinch roller 169 and a compression spring 170 which rests upon a floor 171 extending from the head 164 at the lower end of the surface 165 and forces the pinch roller 169 upward into snug engagement with both the pull bar 143 and the surface 165. The surface 165 is at such an angle that when the grab clutch 161 is pulled downwardly by the links 159 or 160 the grab roller 169 will bind between the surface 165 and the pull bar 143 and pull the bar 143 downwardly with the clutch 161, and so that when the clutch 161 is moved upwardly the pinch roller 169 will readily slide upon the adjacent surface of the bar 143. Provided on the channel frame member 75 is a bracket 172 which extends over the head 164 and has a bolt 173 adjustably provided thereon so as to extend downwardly and contact the roller 169 and move this downward so as to prevent the clutch 161 from grabbing the bar 143 while the pair of levers 149 is in upward position.

Connecting to fittings 175 mounted on the pins 158 and to the channel frame member 75 are coiled tension springs 176 which yieldably maintain the pair of levers 149 in upward position as shown in Fig. 4.

Referring now specifically to Figs. 12 to 17 inclusive, a standard California orange shipping box 180 is made up as follows:

The bottom slats 181 are nailed solidly against lower faces of end pieces 182 and a middle partition 183. Side slats 184 and 185 are then secured to the opposite side edges of the end pieces 182 and the middle partition 183 in the manner shown in Figs. 12, 14 and 16 by nails 186.

No special equipment is shown for making up the box 180 in the manner described, as this can readily be done by hand. Each box 180 has a lid or cover 188, this preferably including four slats 189 connected at their ends, as shown, by cleats 190.

The operation of my invention is as follows:

As previously mentioned, the drawings illustrate the operation of my method and apparatus in the packing of oranges, and oranges of the size of 176 to the box are chosen for illustrative purposes, although the method works equally well with any of the other commercial sizes of fruit.

The "176" pack in general use in California includes five layers of fruit packed in the box as shown in Figs. 12 to 15 inclusive. Fig. 12 shows the bottom layer, which is the same as the middle and top layers. The second and fourth layers, instead of having three rows of four and two rows of three oranges in each end of the box, have three rows of three and two rows of four oranges.

The view of Fig. 13 shows the disposition of oranges as it would theoretically appear if the fruit were perfect spheres without having a cushion of paper between them and without being pushed down upon each other by the packer. In actual practice the fruit toward the end of the box is pushed down toward the bottom more than that toward the middle, this causing the fruit toward the middle to stand up and support the middle of the lid 188 even after this is nailed tight as shown in Fig. 11, this being what is known as a "high pack."

The views in Figs. 12 to 15 are drawn to scale and the oranges indicated in these views are of correct diameter for the "176" size. It is thus seen that the lower layer of fruit when placed in the expanded box 180 has just enough room to be snugly placed in the box without crowding the fruit. The space which thus accommodates the fruit is one inch wider than the normal interior space in the ordinary California orange shipping box, owing to the fact that each pair of side slats 184 and 185 is disposed one-half inch from the adjacent side edges of the ends and partition of the box 180.

Continuing the operation of my process, the box 180 is rolled over the track 18 into place coextensive with and resting against the side engaging member 90. The lower guard strip 100 thus extends between the side slats 185 and the upper guard 99 is disposed just above the upper edge of the upper slat 185 for a purpose to be made clear later.

The operator of the cover and side press 15 now places the lid 188 over the box 180 in a position shown and steps upon the foot pedal 56 in a manner to depress this without moving the foot plate 150. Depressing the foot pedal 56 draws down upon the vertical slide bar 42 and presses end portions of the lid 188 against the fruit in the box 180. As desired, the lid may or may not at this time be brought with its ends in actual contact with the box ends 182.

In its downward movement, the slide bar 42 carries with it the depressing finger 141 which rotates the rocker 111 on its shaft 81 bringing the side engaging member 118 into contact with the side slats 184 so that the middle guard strip 133 extends between the slats 184 and the upper guard strip 132 extends along the top edge of the uppermost of these slats. With this rotation of the rocker 111 the pull bar 144 is lowered a slight distance through the grab clutch 161. As the lever 51 swings downwardly the pawl 60 engages with teeth on the ratchet-toothed guide bar 54 and retains this lever in position when the foot is removed.

With the side engagement member 118 contacting the box side slats 184 the rollers 136 engage outer surfaces of the box ends 182 so as to prevent any tendency of expansion of these during the pressing in of the sides of the box 180.

It is desired to point out here that the adjustment screws 106 as shown in Fig. 7 are positioned so that when the foot levers 51 and 149 are in inactive position there will be sufficient space between the lower edge of the rocker arm 113 and the roller 87, journalled between the rocker arms 86, so that the depression of the foot pedal 56 sufficiently to bring the side engagement member 118 against the box side slats 184 will just bring the rocker arm 113 into contact with the roller 87.

The operator now steps upon the foot plate 150 bringing it downward with his entire weight. This moves the grab clutch 161 downwardly, pulling with it the pull bar 144 and further swinging the rocker 111 so that the side engagement member 118 presses the side slats 182 snugly against the ends and partition of the box 180, driving home the nails 186 in these slats.

As the rocker arm 113 is in contact with the roller 87 at the commencement of the down stroke of the grab clutch 161 the rockers 84 and 85 are also rotated about the shaft 80 so as to press in the side slats 185 concurrently with the pressing of the side slats 184. During the pressing in of the side slats of the box 180 the fruit is guarded against being cut by edges of these slats by the guards 99 and 100 on one side and 132 and 133 on the other side, these guards lying, as previously described, in the same vertical plane as the side slats adjacent thereto.

The foot is now removed from the pedal 150 permitting the levers 149 to swing upwardly until the bolt 173 engages the grab roller 169, disengaging the grab clutch 161 from the pull down bar 143. Urged by the spring 117 the rockers 84, 85 and 111 are rotated until the rocker arm 113 contacts the depressing finger 141 and the roller 87 engages the lower face of this rocker arm.

The pressing in of the side slats 184 and 185 drives the nails 186 into the ends and partition of the box 180 as shown in Fig. 17 so that when the box side engagement members 90 and 118 draw away the slats 184 and 185 are left nailed tightly to the box ends and partition as shown in Fig. 15.

If the cover 188 has not previously been brought snugly against the box end 182 by depression of the foot lever 51, this may be done now and the cover nailed to the box ends by hand or by an automatic nailing machine which might easily be incorporated with the cover press 16 in a manner well known in the art.

By engaging the catch 59 with the foot and slightly depressing the pedal 50 the dog 60 can be disengaged from the ratchet-guide 54 and the lever 51 permitted to return upward to normal, thus lifting the cover depressors 44 from the cover 188 so that the box 180 is free to be shoved along the roller conveyer 18 onto a discharge conveyer (not shown) which is associated therewith. A metal strap 191 is now applied to the box in a manner shown in Fig. 11 and the box 180 is ready for shipment.

There are many advantages to the packing process of my invention, some of these being set forth as follows:

As before mentioned, no change is made in the character of the container as it appears when ready for shipment. Also there is no necessity for packing any different sizes of fruit in the box than the commercial sizes packed at present. A very great advantage in the process results from the ease with which the fruit may be placed into the box when the side slats are in expanded position. An example of this is easily seen in the scale drawings shown in Figs. 12 to 15 inclusive. The common practice is to take a box with the sides nailed tightly against the ends and partition as shown in Fig. 15 and in packing "176's" to place this fruit in the box according to the plan illustrated. Thus the lower layer of fruit as shown in Fig. 12 in an expanded box is packed by hand into unexpanded boxes. As the first layer of fruit is placed in the expanded box the pieces of fruit are just in contact with each other so that no special pressure is necessary to force any piece of fruit into its proper place. In the method in common use four longitudinal rows, that is, two rows of four and two rows of three would be placed in the box, and the last row of four oranges would have to be squeezed into a space which is one inch less in width than the width of the space provided in the expanded box for this fruit. In packing according to the common practice, therefore, the last row of fruit in each tier must be pushed into this inadequate space, which results in consumption of considerable of the packer's time and frequently in the damaging of the fruit by the fingers of inexperienced packers. In my process the possibility of damaging the fruit in this manner is entirely eliminated because sufficient room is provided to place each piece of fruit in its proper position without applying any force. This saves a great deal of the packer's time, as approximately one-third of the time of packing a box is spent in pushing into place the last rows of fruit in the various tiers. In packing oranges by hand, therefore, my process permits a sufficient increase in speed of packing so as to save one cent or more per box in packing costs.

In addition to lowering the cost of packing fruit by hand, my method also provides a logical basis for a packing machine which will take the place of hand labor and eliminate the problem of obtaining skilled packing labor in widely varying quantities throughout the year.

While I have shown and described the process and apparatus of my invention as adapted for the packing of oranges, it is to be understood that it may be used equally well in packing many other kinds of fruits and vegetables and that although the disclosure is of a specific embodiment of my apparatus many changes and modifications may be made therein without departing from the spirit of the invention or the scope of the appended claims.

What I claim is:

1. A method of packing fruit which consists in grouping a plurality of pieces of fruit in a confined space larger than that in which it is desired to ship it, compressing said fruit in at least two directions to bring it into the proper shipping space, and completely confining said fruit in a suitable container for shipment having a materially smaller volume than said original space into which said fruit was grouped.

2. A method of packing fruit which consists in grouping a plurality of pieces of fruit in a confined but uncovered space to form a body or fruit substantially conforming to said space, covering said space, and compressing said body from a face other than that covered, to form a relatively tight pack.

3. A method of packing fruit which consists in grouping a plurality of pieces of fruit in a confined but uncovered space to form a body of fruit substantially conforming to said space, covering said space, and compressing said body from a substantially vertical face to form a relatively tight pack.

4. A method of packing fruit which consists in grouping a plurality of pieces of fruit in a confined but uncovered space to form a body of fruit substantially conforming to said space, and compressing said body both from a side and the top thereof to form a relatively tight pack.

5. A method of packing fruit which consists in packing the fruit in a container in which one of the fruit supporting members of said container is disposed in a relatively expanded position, and moving said member inwardly to compress said fruit.

6. A method of packing fruit which consists in packing the fruit in an open container in which one of the fruit confining members of said container is disposed in a relatively expanded position, covering said container, and moving said member inwardly to compress said fruit.

7. A method of packing fruit in a box having side, bottom and end members and a lid, and which consists in packing the fruit relatively loosely in said box while open and with one of said members disposed in an expanded position, and relatively tightly confining said fruit by moving said member inwardly and lidding said box.

8. A method of packing fruit in a box having side, bottom and end members and a lid, and which consists in packing the fruit relatively loosely in said box while open and with one of said side members disposed in an expanded position, and relatively tightly confining said fruit by moving said side member inwardly and lidding said box.

9. A method of packing fruit in a box having a lid, base members and a pressure member applied to said base members by nails, said method consisting in making up said box with said pressure member spaced from one or more of said base members and with said nails, at said spaced points being driven through said pressure member and into said one or more of said base members, packing the fruit relatively loosely in said box while open, and confining said fruit relatively tightly by pressing in said pressure member so as to drive said nails further into said one or more of said base members and lidding said box.

10. A method of packing fresh fruit in a shipping container which consists in preparing said container with the lid off and having an interior space with an abnormally large net cubical content, packing said fruit in said container loosely, compressing said container so as to substantially and permanently decrease said interior space and compress said fruit, and lidding said container.

In testimony whereof, I have hereunto set my hand at Los Angeles, California, this 18th day of June, 1929.

EDWARD F. MEER.